United States Patent
Hitchcock

(10) Patent No.: US 11,078,748 B2
(45) Date of Patent: Aug. 3, 2021

(54) LOST CIRCULATION SHAPES

(71) Applicant: Saudi Arabian Oil Company, Dhahran (SA)

(72) Inventor: Graham Hitchcock, Aberdeenshire (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 69 days.

(21) Appl. No.: 16/268,088

(22) Filed: Feb. 5, 2019

(65) Prior Publication Data
US 2020/0248527 A1 Aug. 6, 2020

(51) Int. Cl.
 E21B 33/13 (2006.01)
 E21B 21/00 (2006.01)

(52) U.S. Cl.
 CPC ............ *E21B 33/13* (2013.01); *E21B 21/003* (2013.01)

(58) Field of Classification Search
 CPC ............................... E21B 33/13; E21B 21/003
 See application file for complete search history.

(56) References Cited

U.S. PATENT DOCUMENTS

| | | | |
|---|---|---|---|
| 4,505,334 A | 3/1985 | Doner et al. | |
| 5,309,995 A | 5/1994 | Gonzalez et al. | |
| 5,485,882 A | 1/1996 | Bailey et al. | |
| 5,803,666 A | 9/1998 | Keller | |
| 6,170,531 B1 | 1/2001 | Jung et al. | |
| 7,647,964 B2 | 1/2010 | Akbar et al. | |
| 8,231,947 B2 | 7/2012 | Vaidya et al. | |
| 8,567,491 B2 | 10/2013 | Lurie | |
| 9,631,468 B2 | 4/2017 | Miller | |
| 2004/0238218 A1* | 12/2004 | Runia | E21B 10/62 175/57 |
| 2010/0193244 A1 | 8/2010 | Hoskins | |
| 2013/0068478 A1 | 3/2013 | Allen et al. | |
| 2015/0008004 A1 | 1/2015 | Kirkpatrick | |
| 2015/0020908 A1 | 1/2015 | Warren | |
| 2016/0237767 A1* | 8/2016 | Snoswell | C04B 28/02 |
| 2016/0244654 A1 | 8/2016 | Way et al. | |

FOREIGN PATENT DOCUMENTS

WO 2015071787 A1 5/2015

OTHER PUBLICATIONS

International Search Report and Written Opinion for related PCT application PCT/US2020/016786 dated Jun. 5, 2020.

* cited by examiner

*Primary Examiner* — Crystal J Miller
(74) *Attorney, Agent, or Firm* — Bracewell LLP; Constance G. Rhebergen; Linda L Morgan

(57) ABSTRACT

Systems and methods for sealing a lost circulation zone associated with a subterranean well include a drill string with a circulating port and a lost circulation material. A lost circulation shape is a hollow body having an outer skin and an open interior chamber. The outer skin includes a plurality of perforations that extend through the outer skin, providing fluid communication between an exterior of the lost circulation shape and the open interior chamber. The plurality of perforations are sized to prohibit a passage of lost circulation material between the exterior of the lost circulation shape and the open interior chamber.

8 Claims, 4 Drawing Sheets

FIG. 5

LOST CIRCULATION SHAPES

BACKGROUND OF THE DISCLOSURE

1. Field of the Disclosure

The present disclosure relates to subterranean developments, and more specifically, the disclosure relates to managing lost circulation associated with a subterranean well.

2. Description of the Related Art

During the drilling of subterranean wells, such as subterranean wells used in hydrocarbon development operations, drilling mud and other fluids can be pumped into the well. In certain drilling operations, the wellbore of the subterranean well can pass through a zone that has induced or natural fractures, are cavernous, or otherwise have an increased permeability, which is known as a lost circulation zone. In such a case, the drilling mud and other fluids that are pumped into the well can flow into the lost circulation zone and become irretrievable.

Lost circulation can be encountered during any stage of hydrocarbon development operations. Lost circulation can be identified when drilling fluid that is pumped into the subterranean well returns partially or does not return to the surface. While some fluid loss is expected, excessive fluid loss is not desirable from a safety, an economical, or an environmental point of view. Lost circulation can result in difficulties with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

SUMMARY OF THE DISCLOSURE

When unacceptable drilling fluid losses are encountered, conventional lost circulation materials are deployed with the drilling fluid from the surface. The revised fluid that includes the conventional lost circulation materials is pumped downhole as part of the standard well circulation system. The revised fluid passes through a circulation port to plug and pressure seal the exposed formation at the point where losses are occurring. Once sealing has occurred and acceptable fluid loss control is established, drilling operations can resume. Conventional currently available lost circulation material is most effective at sealing regularly shaped formation voids with widths up to approximately 4-6 millimeters (mm). In voids with larger widths, effective sealing is often both challenging and costly.

Embodiments of this disclosure provide a lost circulation shape that operates as a complimentary addition to conventional lost circulation material as described in this disclosure. The lost circulation shape can be deployed with the conventional lost circulation material. The lost circulation shape is a hollow perforated geometric shape that can fill with drilling fluid and have a generally neutral buoyancy in the drilling fluid. Due to this generally neutral buoyancy the lost circulation shape can move downhole freely with the drilling fluid and exit the drill string through the circulation port with the conventional lost circulation material. The lost circulation shape would be drawn into thief zone cavities or vugulars. The lost circulation shape can act as a trap for the conventional lost circulation material and allow for accumulation and bridging of the lost circulation material onto the lost circulation shape. This will result in eventual plugging of the formation.

In an embodiment of this disclosure, a system for sealing a lost circulation zone associated with a subterranean well includes a lost circulation material and a lost circulation shape. The lost circulation shape is a hollow body having an outer skin and an open interior chamber. The outer skin includes a plurality of perforations that extend through the outer skin, providing fluid communication between an exterior of the lost circulation shape and the open interior chamber. The plurality of perforations are sized to prohibit a passage of lost circulation material between the exterior of the lost circulation shape and the open interior chamber.

In alternate embodiments, the lost circulation shape can have a minimum size and a maximum size. The minimum size of the lost circulation shape can be such that a smallest minimum sphere in which the lost circulation shape having the minimum size could fit has a diameter of 5 mm. The maximum size of the lost circulation shape can be such that a smallest maximum sphere in which the lost circulation shape having the maximum size could fit has a diameter of 15 mm. The lost circulation shape can include a filling hole, the filling hole extending through the outer skin and having a diameter in a range of 2.5 mm to 5 mm. Filling the open interior chamber with drilling fluid can include applying a vacuum or applying a pressure to the lost circulation shape before circulating the lost circulation material through the drill string.

In other alternate embodiments, the open interior chamber can include a drilling fluid with a drilling fluid density. The lost circulation shape can have an average lost circulation shape density. A difference between the average lost circulation shape density and the drilling fluid density can be 20% or less of the drilling fluid density. Alternately, the difference between the average lost circulation shape density and the drilling fluid density can be 10% or less of the drilling fluid density.

In yet other alternate embodiments, the system can further include a circulating sub and a circulating port that extends through a sidewall of the circulating sub. The lost circulation shape can be sized to flow through the circulating sub port with a drilling fluid. The plurality of perforations can be sized to trap the lost circulation material within the lost circulation zone for forming a seal within the lost circulation zone.

In still other alternate embodiments the system can further include a drill string having a circulating port. The drill string can be located within a wellbore of the subterranean well and defines an annular space between an outer diameter surface of the drill string and an inner diameter surface of the wellbore. The lost circulation material can be located within a drilling fluid traveling downhole within the drill string, through the circulating port, and into the annular space. The lost circulation shape can be located within the drilling fluid travelling downhole within the drill string, through the circulating port, and into the annular space.

In yet another embodiment of this disclosure, a method for sealing a lost circulation zone associated with a subterranean well includes providing a drill string with a circulating port in the subterranean well. A lost circulation shape can be circulated through the drill string. The lost circulation shape can be a hollow body having an outer skin and an open interior chamber. The outer skin includes a plurality of perforations that extend through the outer skin, providing fluid communication between an exterior of the lost circulation shape and the open interior chamber. The plurality of perforations are sized to prohibit a passage of a lost circulation material between the exterior of the lost circulation shape and the open interior chamber. The lost circulation material can be circulated through the drill string.

In other embodiments, the lost circulation shape can be sized to be introduced into cavities of the lost circulation zone, forming a wedged lost circulation shape. The method can further include trapping lost circulation material with the wedged lost circulation shape to seal the lost circulation zone. The lost circulation shape can include a filling hole that extends through the outer skin and has a diameter in a range of 2.5 mm to 5 mm. The method can further include filling the open interior chamber with drilling fluid that travels through the filling hole.

In other alternate embodiments, the lost circulation shape can have an average lost circulation shape density. A difference between the average lost circulation shape density and a drilling fluid density can be 20% or less of the drilling fluid density. Alternately, a difference between the average lost circulation shape density and a drilling fluid density can be 10% or less of the drilling fluid density. The drill string can further include a circulating sub and the circulating port can be a circulating sub port that extends through a sidewall of the circulating sub. The lost circulation shape can be sized to flow through the circulating sub port with a drilling fluid.

In yet other alternate embodiments, an annular space can be defined between an outer diameter surface of the drill string and an inner diameter surface of the wellbore. Circulating a lost circulation shape through the drill string can include circulating the lost circulation material within a drilling fluid traveling downhole within the drill string, through the circulating port, and into the annular space. Circulating the lost circulation material through the drill string can include circulating the lost circulation shape within the drilling fluid travelling downhole within the drill string, through the circulating port, and into the annular space.

BRIEF DESCRIPTION OF THE DRAWINGS

So that the manner in which the features, aspects and advantages of the embodiments of this disclosure, as well as others that will become apparent, are attained and can be understood in detail, a more particular description of the disclosure may be had by reference to the embodiments that are illustrated in the drawings that form a part of this specification. It is to be noted, however, that the appended drawings illustrate only certain embodiments of the disclosure and are not to be considered limiting of the disclosure's scope, for the disclosure may admit to other equally effective embodiments.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
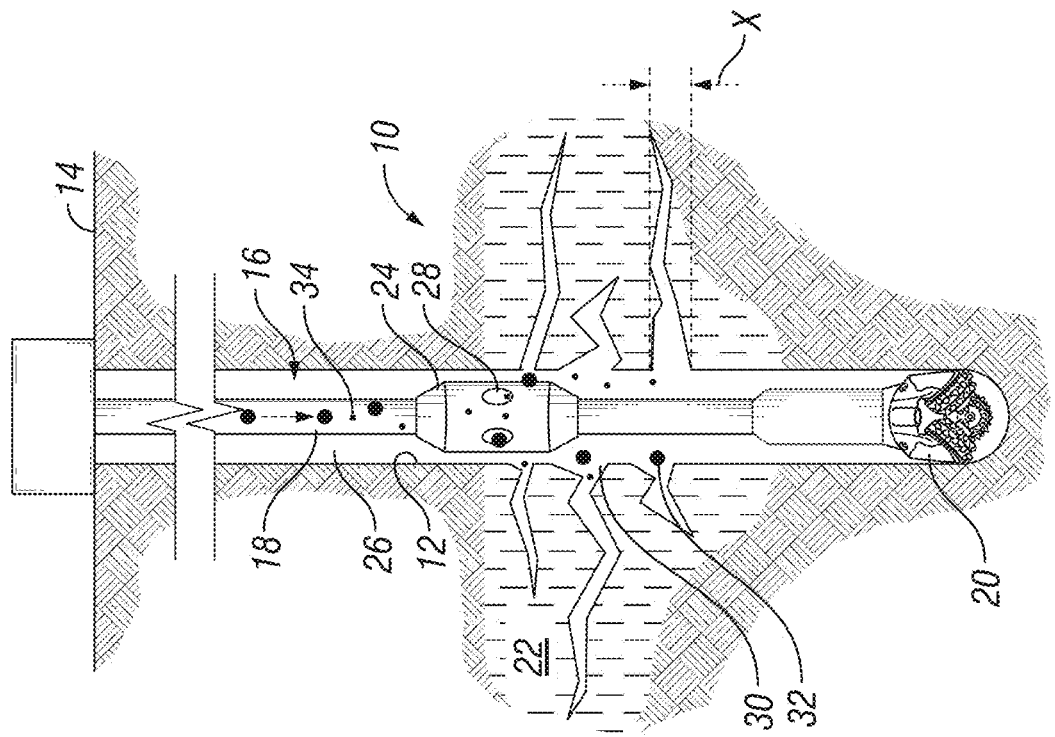
FIG. 1 is a section view of a subterranean well with a drill string having a circulating sub, in accordance with an embodiment of this disclosure.

Looking at FIG. 1, subterranean well 10 can have wellbore 12 that extends to an earth's surface 14. Subterranean well 10 can be an offshore well or a land based well, and can be used for producing hydrocarbons from subterranean hydrocarbon reservoirs. Drill string 16 can be delivered into and located within wellbore 12. Drill string 16 can include tubular member 18 and bottom hole assembly 20. Tubular member 18 can extend from surface 14 into subterranean well 10. Bottom hole assembly 20 can include, for example, drill collars, stabilizers, reamers, shocks, a bit sub and the drill bit. Drill string 16 can be used to drill wellbore 12. In certain embodiments, tubular member 18 is rotated to rotate the bit to drill wellbore 12.

Wellbore 12 can be drilled through lost circulation zone 22. In embodiments lost circulation zone 22 is a layer of a subterranean formation that is located uphole of a hydrocarbon formation, downhole of a hydrocarbon formation, or between separate hydrocarbon formations. In certain embodiments, drill string 16 can pass through a cased section of wellbore 12 of subterranean well 10 in order to reach uncased open hole portion of wellbore 12.

A system for sealing lost circulation zone 22 associated with subterranean well 10 includes a circulating port to provide downhole fluid circulation. The circulating port provides fluid communication between an inner bore of drill string 16 and annular space 26

Annular space 26 is the elongated annular shaped space that extends a length of drill string 16 and is defined between an outer diameter surface of drill string 16 and an inner diameter surface wellbore 12. During downhole fluid circulation, fluids can flow downhole through the inner bore of drill string 16 and uphole through annular space 26. In reverse circulation, fluids can flow downhole through annular space 26 and uphole through the inner bore of drill string 16.

In the example embodiment, drill string 16 can include circulating sub 24. Circulating sub 24 can be a circulating sub known and commonly available in the industry for circulating fluids downhole. Circulating sub 24 can include circulating sub port 28, which is a circulating port. Circulating sub port 28 extends through a sidewall of circulating sub 24 and provides fluid communication between the inner bore of drill string 16 and annular space 26. In alternate embodiments, bottom hole assembly 20 can include the circulating port.

The system for sealing lost circulation zone 22 can be used to seal the entry of cavity 30 of lost circulation zone that has a cross sectional dimension X up to 25 mm which cannot be sealed with some currently available lost circulation material. Cavity 30 can be, for example, vugular or cavernous faults. Looking at FIG. 2, after bottom hole assembly 20 has reached or passed through lost circulation zone 22, a combination of lost circulation shape 32 and lost circulation material 34 can be used to seal cavities 30 of lost circulation zone 22.

Figure 2:
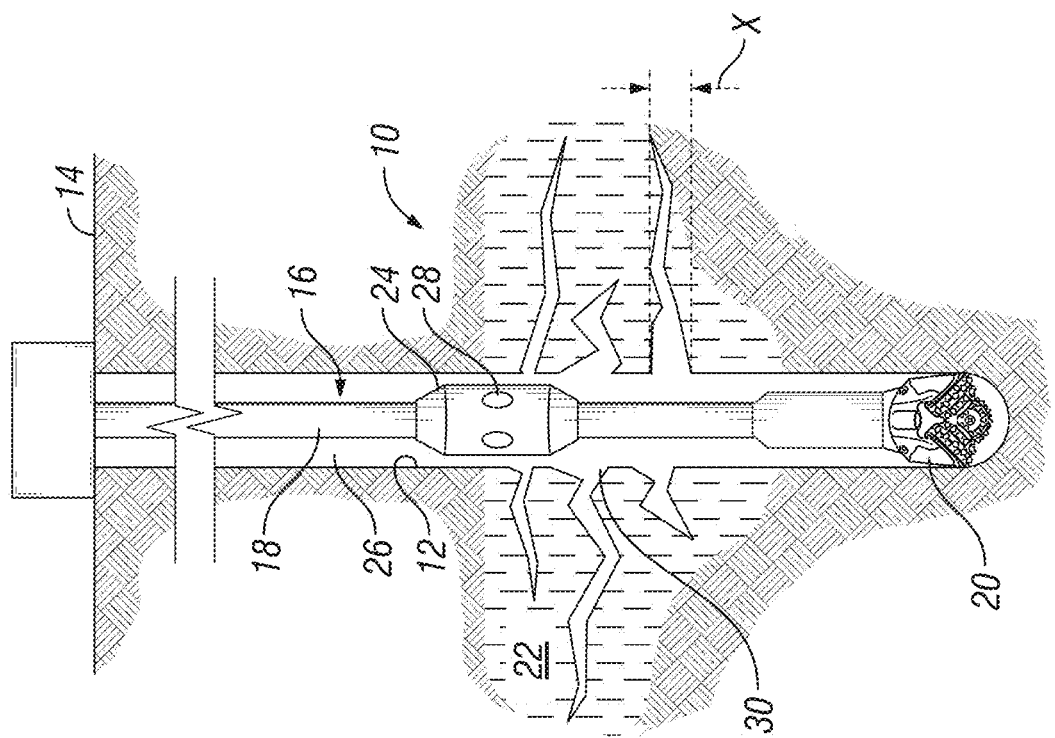
FIG. 2 is a section view of a subterranean well with the drill string having a circulating sub of FIG. 1, shown delivering lost circulations spheres to a lost circulation zone.

In the example embodiment of FIG. 2, lost circulation shape 32 and lost circulation material 34 is pumped in a direction downhole through drill string 16, and exits circulating sub port 28 to reach annular space 26 for delivery to lost circulation zone 22.

Figure 3:
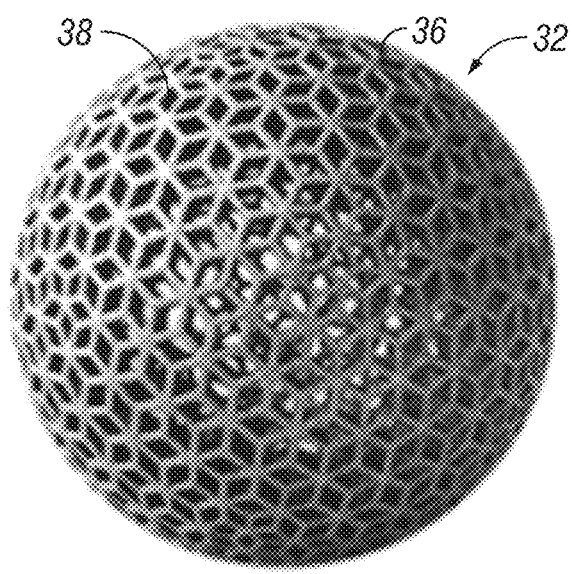
FIGS. 3-4 are perspective views of lost circulation shapes with example perforation patterns, in accordance with an embodiment of this disclosure.

Looking at FIG. 3, lost circulation shape 32 is a hollow body having an outer skin 36 that defines the shape of lost circulation shape 32 and an open interior chamber. Outer skin 36 can have a thickness in a range of 0.5 mm to 2.5 mm. Lost circulation shape 32 can have a variety of diameters. In general, a smaller diameter lost circulation shape 32 can have a smaller thickness of outer skin 36 and a larger diameter lost circulation shape 32 can have a larger thickness of outer skin 36. In certain embodiments, the thickness of outer skin 36 can be directly proportional to the diameter of lost circulation shape 32. In alternate embodiments, when lost circulation shape 32 has a larger diameter, lost circulation shape 32 can include an internal support structure, such as a web type structure, to provide internal support to outer skin 36.

In the example embodiments shown, lost circulation shape 32 is a sphere. In alternate embodiments, lost circulation shape 32 can have other three dimensional geometric shapes. As an example, lost circulation shape 32 can generally have the shape of a cube, ovoid, egg, hyper rectangle, triangular prism, pyramid, cone, or cylinder.

Lost circulation shape 32 can have a sufficient size to seal lost circulation zone 22, without being so large in size that lost circulation shape 32 cannot fit through the circulation port. Lost circulation shape 32 is sized to flow through the circulation port with a drilling fluid in an unrestricted manner. In certain embodiments, a mix of various sizes of lost circulation shapes 32 can be used for sealing cavities 30 of various sizes.

In certain embodiments, lost circulation shape 32 can be formed in a variety of sizes. In certain embodiments, the smallest of lost circulation shape 32 has a minimum size. The minimum size of lost circulation shape 32 is such that the smallest minimum hypothetical sphere in which lost circulation shape 32 having the minimum size could fit has a diameter of 5 mm, regardless of the geometric shape of lost circulation shape 32. The largest of lost circulation shape 32 has a maximum size. The maximum size of lost circulation shape 32 is such that a smallest maximum hypothetical sphere in which lost circulation shape 32 having the maximum size could fit has a diameter of 15 mm regardless of the geometric shape of lost circulation shape 32.

Lost circulation shape 32 can be formed of a metal, ceramic, or polymeric material. As an example, lost circulation shape 32 could be formed of any of a variety of suitable metallic materials, such as, for example, aluminum, titanium, copper, or nickel. Alternately, lost circulation shape 32 could be formed of any of a variety of suitable ceramic materials, such as, for example, gypsum, alumina, zircon, silicon nitride, glass, or silicate. Alternately, lost circulation shape 32 could be formed of any of a variety of suitable polymeric materials including plastic, thermoplastic and elastomers, such as, for example, acrylonitrile butadiene styrene (ABS), high-impact polystyrene (HIPS), polypropylene, polyethylene, nylon, acrylic, polyethylene terephthalate (PET), poly carbonate, or polyurethane.

Alternately, lost circulation shape 32 can be formed of other materials that are suitable for additive manufacturing, 3D printing, or other appropriate fabrication techniques.

The material used to form lost circulation shape 32 can be determined by the drilling application, the selected drilling fluid, and the lost circulation material 34 that is to be used for a particular application. In embodiments of this disclosure, lost circulation material 34 and lost circulation shape 32 can be used to solve a total loss situation where there is no need for removal of lost circulation material 34 and lost circulation shape 32. In other embodiments, lost circulation material 34 and lost circulation shape 32 could be formed of a removable material. As an example, lost circulation material 34 and lost circulation shape 32 could be formed of aluminum that could be dissolved and removed with an acid treatment.

Outer skin 36 of lost circulation shape 32 includes a plurality of perforations 38 that extend through outer skin 36. Perforations 38 provide fluid communication between an exterior of lost circulation shape 32 and the open interior chamber of lost circulation shape 32. Perforations 38 allow for drilling fluid to enter the open interior chamber of lost circulation shape 32. Because the drilling fluid can pass into and through lost circulation shape 32, minimal hydrostatic forces are applied to lost circulation shape 32 downhole. Larger perforations 38 will minimize the hydrostatic forces. However, if perforations 38 are too large, then lost circulation shape 32 will not trap lost circulation material 34. The size, shape, and number of perforations 38 can be optimized for each individual application. Alternately, a generic layout of perforations 38 can be developed with the size, shape, and number of perforations selected to function in a variety of subterranean wells 10.

Perforations 38 are sized to minimize or prohibit the passage of lost circulation material 34 between the exterior of lost circulation shape 32 and the open interior chamber of lost circulation shape 32. Perforations 38 are sized to trap lost circulation material 34 within lost circulation zone 22, forming a seal within lost circulation zone 22. As an example, perforations 38 can have dimensions that are smaller in size than lost circulation material 34 (FIG. 2). Alternately some commonly available lost circulation material 34 is capable of sealing cavities 30 that have a dimension larger than the size of lost circulation material 34. In certain embodiments the maximum size of perforations 38 will be smaller than the maximum bridging limitation of lost circulation material 34. In such embodiments the maximum size of perforations 38 can be larger than the size of lost circulation material 34 so that some lost circulation material 34 pass through perforations 38 before lost circulation material 34 bridges across lost circulation shape 32. Performance data can be obtained relating to the capabilities of currently available lost circulation material 34. Such performance data can include the size of cavities that can be sealed with such lost circulation material. The performance data for a selected lost circulation material can be referenced for determining a suitable size of perforations 38.

Figure 4:
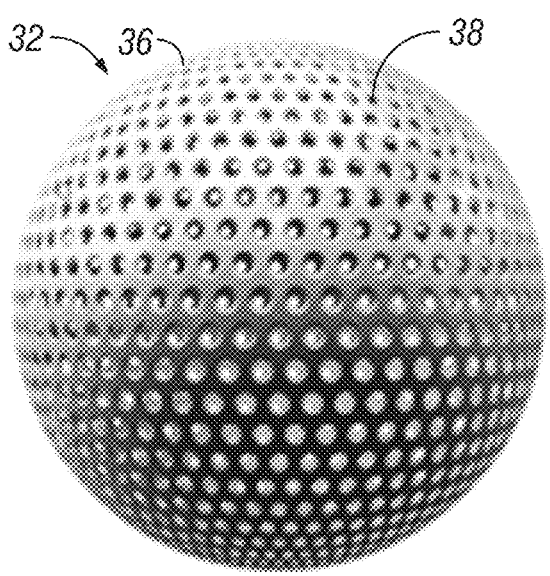

In the example of FIG. 3 perforations 38 through outer skin 36 of lost circulation shape 32 are diamond shaped. In the Example of FIG. 4, perforations 38 through outer skin 36 of lost circulation shape 32 are circular. When perforations 38 are circular perforations 38 can have, for example, a size in a range of 1 mm to 4 mm in diameter. In alternate embodiments perforations 38 can have other shapes. For example purposes only, perforations 38 can be shaped as squares, hexagons, pentagons, triangles, rectangles, diamonds, circles or combinations of any of these shapes. The size, shape, and spacing of perforations 38 can be selected for optimized performance with a selected lost circulation material 34 (FIG. 2). If the number of perforations 38 is large enough that the structural integrity of lost circulation shape 32 is compromised, then structural members may be added within the open interior chamber of lost circulation shape 32.

Figure 5:
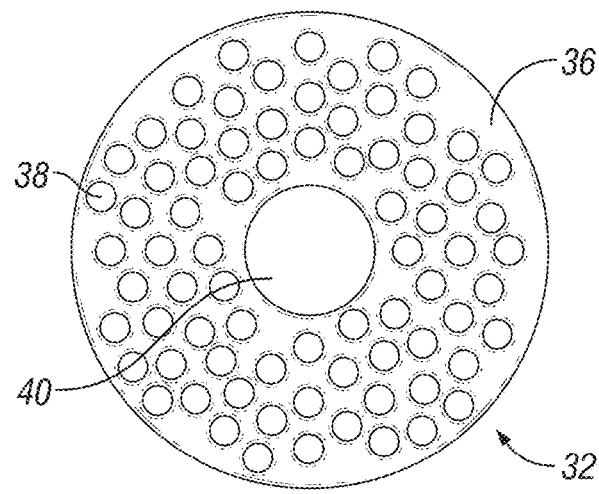
FIG. 5 is a top view of a lost circulation shape with an example perforation pattern and filling hole, in accordance with an embodiment of this disclosure.

Looking at FIG. 5, lost circulation shape 32 can further include filling hole 40. Filling hole 40 extends through outer skin 36. In certain embodiments, filling hole 40 can have a diameter in a range of 2.5 mm to 5 mm. Filling hole 40 facilitates the filling of the open interior chamber with drilling fluid. In certain embodiments, the filling of lost circulation shape 32 could be assisted by holding the lost circulation shape under vacuum and then introducing drilling fluid. Alternately, a pressure can be applied instead of a vacuum for filling the open interior chamber with drilling fluid. Using a vacuum or pressure would be most useful when perforations 38 are sufficiently small that drilling fluid does not travel easily into the open interior chamber. Using a vacuum or pressure can overcome surface tension that could prevent the open interior chamber from filling with drilling fluid before lost circulation shape 32 is circulated downhole through drill string 16. Filling hole 40 may or may not be a requirement depending on the size and arrangement of perforations 38 and the resulting buoyancy of lost circulation shape 32 in the drilling fluid.

The density of lost circulation shape 32 together with the presence of drilling fluid within the open interior chamber of lost circulation shape 32 allow lost circulation shape 32 to have generally neutral buoyancy within the drilling fluid. As used in this disclosure, a generally neutral buoyancy means that the lost circulation shapes will flow with the drilling fluid and will not tend to sink or rise relative to the movement of the drilling fluid.

Because of the drilling fluid located within the open interior chamber of lost circulation shape 32, the average lost circulation shape density does not need to be absolutely equal to the drilling fluid density that is carrying lost circulation shape 32. The lost circulation shape 32 can be carried by the drilling fluid free of excessive sinking or rising of lost circulation shape 32 relative to the movement of the drilling fluid if an average lost circulation shape density is near to the density of the drilling fluid. As an example, in certain embodiments the difference between the average lost circulation shape density and the drilling fluid density is 20% or less of the drilling fluid density. In alternate example embodiments, the difference between the average lost circulation shape density and the drilling fluid density is 10% or less of the drilling fluid density.

For the sake of clarity, as an example, a drilling fluid density of some currently available drilling fluid can range from 8.0 pounds per gallon (ppg) to 20 ppg. If a drilling fluid with a density of 20 ppg is used, then 20% of 20 ppg is 4 ppg. In this example embodiment, if the difference between the average lost circulation shape density and the drilling fluid density is 20% or less of the drilling fluid density, then the average lost circulation shape density can be in a range of 16 ppg to 24 ppg.

In embodiments of this disclosure, a mixture of both lost circulation shape 32 and lost circulation material 34 is used to seal lost circulation zone 22. If some currently available lost circulation material only was used (with no lost circulation shape 32), the lost circulation material could flow into and out of cavities 30 without forming a seal. Some commonly used currently available lost circulation material would be too small relative to the cross sectional dimension X of cavity 30 for such lost circulation material to effectively and dependably seal lost circulation zone 22. If lost circulations shapes 32 were used alone, it is possible that with a sufficient number of lost circulations shapes 32 that eventually lost circulation zone 22 could be sealed. However, because perforations 38 through outer skin 36 could continue to allow for the flow of fluids into and out of the open interior chamber of lost circulation shapes 32, lost circulation would therefore only be somewhat restricted.

Figure 6:
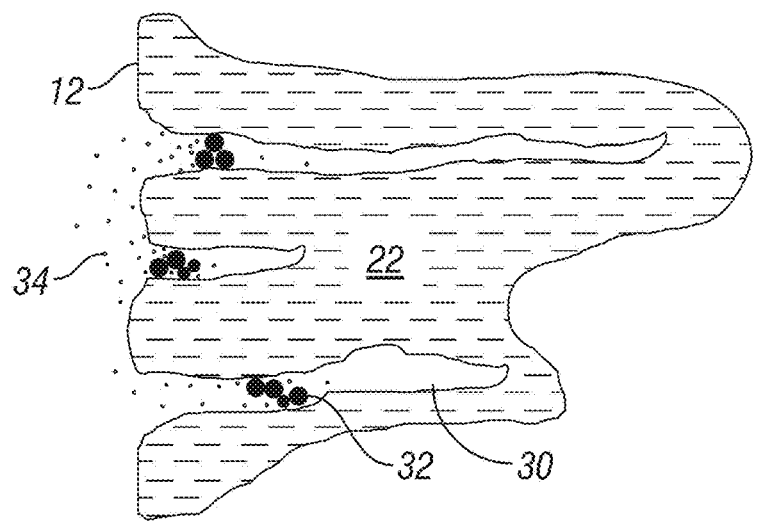
FIGS. 6-8 are section views of a lost circulation zone showing the progression of blocking the lost circulation zone with lost circulation shapes and lost circulation material, in accordance with an embodiment of this disclosure.
Figure 7:
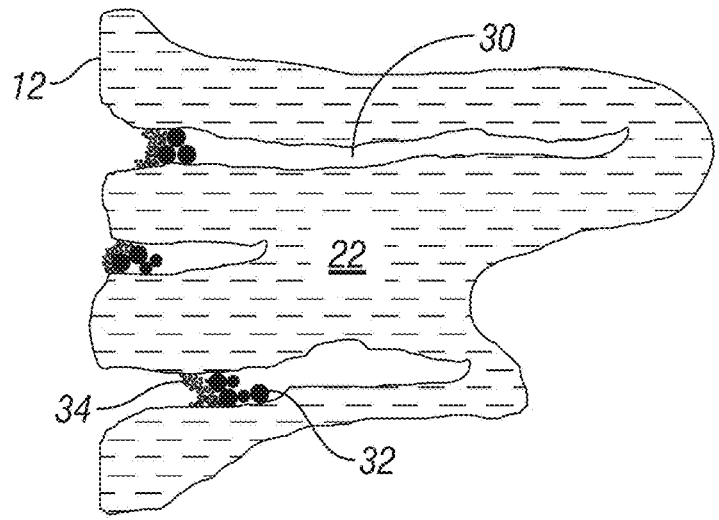

Looking at FIG. 6, lost circulation material 34, and lost circulation shape 32 can be used together and pumped into cavity 30. Looking at FIG. 7, by using both lost circulation shape 32 and lost circulation material 34, lost circulation shape 32 can be sized to be wedged into cavities 30 of lost circulation zone 22, forming a wedged lost circulation shape. With lost circulation shape 32 constrained within lost circulation zone, loss flow will continue through perforations 38. Due to the small size of perforations 38, lost circulation material 34 will collect and within and on the outer surfaces of lost circulation shape 32. Lost circulation material 34 can be trapped by the wedged lost circulation shape to seal lost circulation zone 22. Lost circulation material 34 will collect and bridge and cause a total plug and consequent pressure seal. During such process, lost circulation shape 32 may be deformed, collapse, or be crushed due to well bore pressure acting on the formation. Such pressure will force lost circulation shape 32 and lost circulation material 34 further into cavities 30, thereby giving a fully anchored seal. In alternate embodiments, lost circulation shape 32 may not be deformed, collapse or be crushed, but maintain its original 3-dimensional structure.

In an example of operation and looking at FIG. 2, lost circulation shape 32 and lost circulation material 34 are circulated downhole through drill string 16 with drilling fluid. The drilling fluid can be formulated for the particular conditions of wellbore 12. The drilling fluid can be, for example, a water based mud, an oil based mud, or a synthetic based mud.

Lost circulation shape 32 and lost circulation material 34 can be introduced into drill string 16 at surface 14 and can exit drill string 16 through circulating sub port 28. Because lost circulation shape 32 is generally neutrally buoyant in the drilling fluid, the pumping time required for delivering lost circulation material 34 to lost circulation zone 22 can be calculated by volume displacement methods, which is well understood in the art of circulating fluids in wellbores.

During the process of delivering lost circulation shape 32 and lost circulation material 34 downhole, if drilling operations could continue for a process that used only the lost circulation material 34, this process would not change with the addition of lost circulation shape 32. Therefore, embodiments for delivering the lost circulation shape 32 and lost circulation material 34 downhole could be undertaken while drilling operations continue and without having to remove drill string 16 from wellbore 12. The addition of lost circulation shape 32 may not otherwise change the lost circulation sealing procedure.

Figure 8:
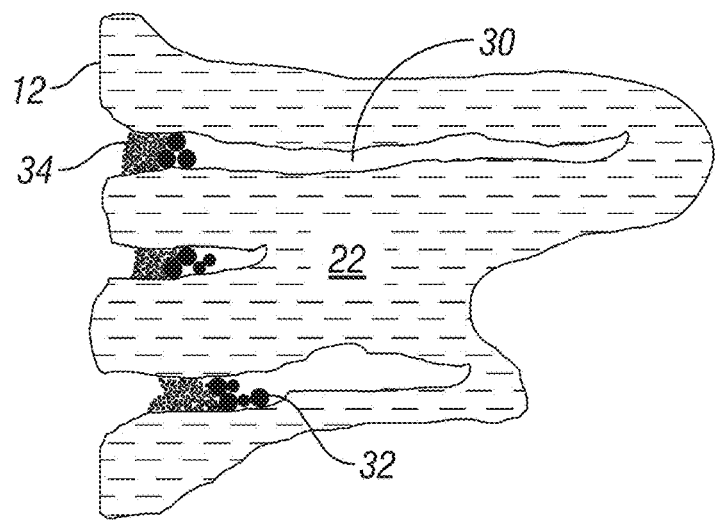
Figure 9:
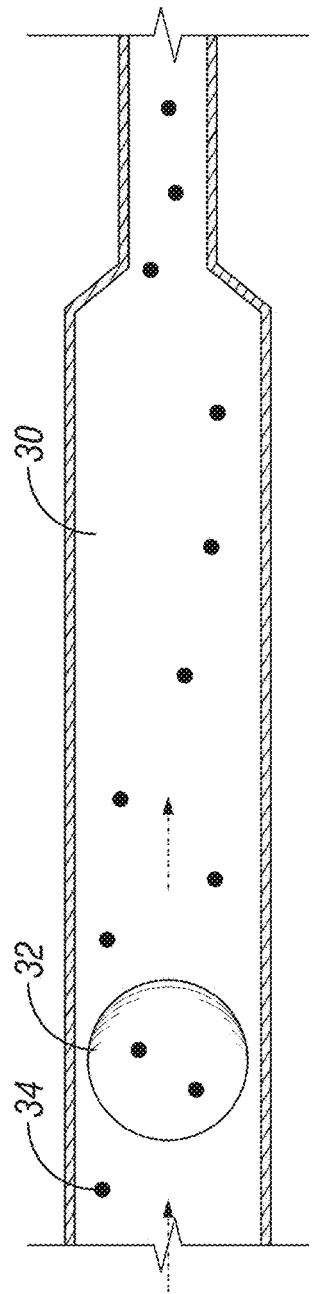
FIGS. 9-11 are detailed schematic section views of cavity of a lost circulation zone showing the progression of blocking the lost circulation zone with lost circulation shapes and lost circulation material, in accordance with an embodiment of this disclosure.
Figure 10:
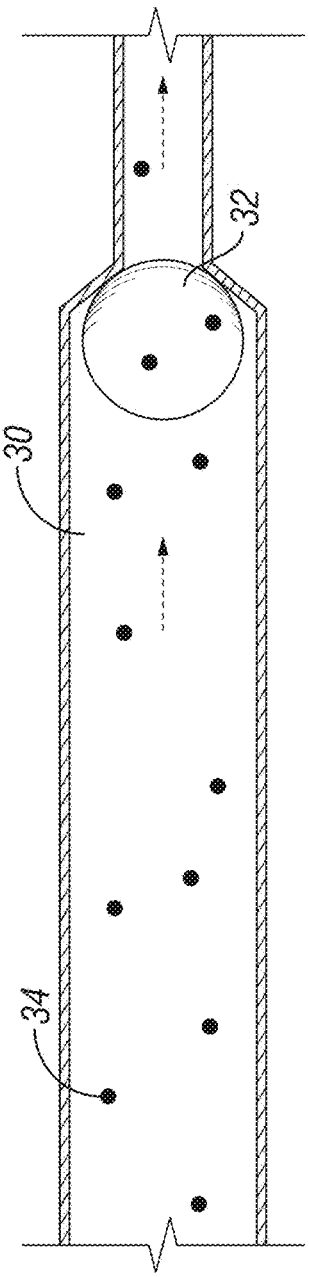

Looking at FIGS. 6 and 9, lost circulation shape 32 and lost circulation material 34 enter cavity 30. Looking at FIGS. 7 and 10, lost circulation shape 32 can become wedged within cavity 30. Looking at FIGS. 8 and 11, as drilling fluid continues to pass through lost circulation shape 32, lost circulation material 34 can become lodged in or against lost circulation shape 32 until a complete formation fault pressure seal is obtained. As lost circulation shape 32 is trapped and lost circulation zone 22 becomes blocked this will result in a pressure differential creation across the blockage formed by lost circulation shape 32 due to the drilling overbalance hydrostatic pressure.

Figure 11:
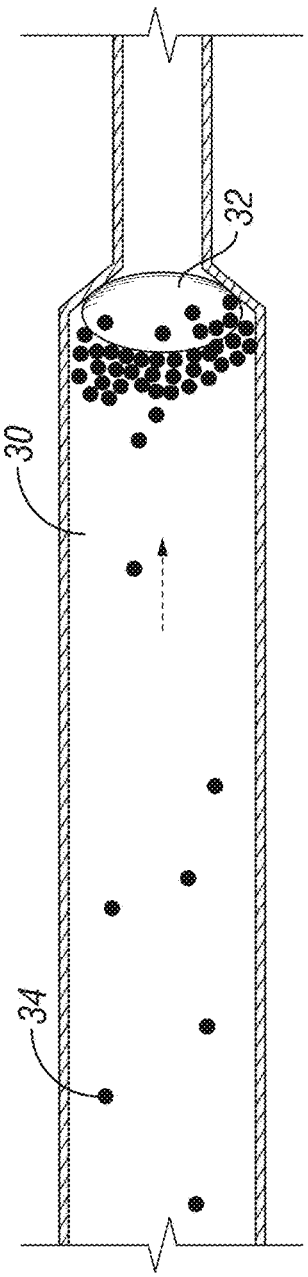

In the example embodiments of FIGS. 8 and 11, lost circulation shape 32 has deformed, collapsed or been crushed within cavity 30. A crushed lost circulation shape 32 could potentially trap lost circulation material more quickly than uncrushed lost circulation shape 32. In addition, a crushed lost circulation shape 32 could potentially become lodged deeper into cavity 30, providing a more secure seal of lost circulation zone 22 (FIG. 1).

Lost circulation shape 32 is sized to be wedged into cavities 30 of lost circulation zone 22, forming a wedged lost circulation shape. Lost circulation material 34 is then trapped by the wedged lost circulation shape to seal lost circulation zone 22.

Embodiments described in this disclosure therefore provide systems and methods that are capable of sealing a lost circulation zone with cavities that are larger than those that can be sealed with currently available lost circulation material. Systems and methods provide for delivery to the lost circulation zone 22 without the need for a specific secondary remedial bottom hole assembly or the need for a longer, adapted, or revised sealing operation.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for sealing a lost circulation zone associated with a subterranean well, the system including:
   a lost circulation material; and
   a lost circulation shape, the lost circulation shape being a hollow body having an outer skin and an open interior chamber filled with a drilling fluid, where the outer skin includes a plurality of perforations that extend through the outer skin, providing fluid communication between an exterior of the lost circulation shape and the open interior chamber; where
   the lost circulation shape has a minimum size and a maximum size, where: the minimum size of the lost circulation shape is such that a smallest minimum sphere in which the lost circulation shape having the minimum size could fit has a diameter of 5 mm; and the maximum size of the lost circulation shape is such that a smallest maximum sphere in which the lost circulation shape having the maximum size could fit has a diameter of 15 mm; where
   at least one of the plurality of perforations is a filling hole, the filling hole sized to provide for filling the open interior chamber with the drilling fluid, where the filling hole has a diameter in a range of 2.5 mm to 5 mm; and
   the other of the plurality of perforations are sized to prohibit a passage of lost circulation material between the exterior of the lost circulation shape and the open interior chamber.

2. The system of claim 1, where the open interior chamber includes a drilling fluid with a drilling fluid density and the lost circulation shape has an average lost circulation shape density, and where a difference between the average lost circulation shape density and the drilling fluid density is 20% or less of the drilling fluid density.

3. The system of claim 1, where the open interior chamber includes a drilling fluid with a drilling fluid density and the lost circulation shape has an average lost circulation shape density, and where a difference between the average lost circulation shape density and the drilling fluid density is 10% or less of the drilling fluid density.

4. The system of claim 1, further including a circulating sub and a circulating port that extends through a sidewall of the circulating sub, and the lost circulation shape is sized to flow through the circulating port with a drilling fluid.

5. The system of claim 1, where the plurality of perforations are sized to trap the lost circulation material within the lost circulation zone for forming a seal within the lost circulation zone.

6. The system of claim 1, the system further including a drill string having a circulating port, the drill string being located within a wellbore of the subterranean well and defining an annular space between an outer diameter surface of the drill string and an inner diameter surface of the wellbore.

7. The system of claim 6, where:
   the lost circulation material is located within a drilling fluid traveling downhole within the drill string, through the circulating port, and into the annular space; and
   the lost circulation shape is located within the drilling fluid travelling downhole within the drill string, through the circulating port, and into the annular space.

8. The system of claim 1, where the filling hole is sized to provide for filling the open interior chamber with the drilling fluid when the lost circulations shape is subjected to a pressure differential.

* * * * *